(12) United States Patent
Wang et al.

(10) Patent No.: US 11,490,418 B2
(45) Date of Patent: Nov. 1, 2022

(54) CHANNEL SCANNING METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventors: Long Wang, Shanghai (CN); Yanchao Xu, Shanghai (CN); Yuren Zhao, Shanghai (CN); Chinghwa Yu, Shanghai (CN)

(73) Assignee: SPREADTRUM COMMUNICATIONS (SHANGHAI) CO., LTD, Shanghai (CN)

( * ) Notice: Subject to any disclaimer, the term of this patent is extended or adjusted under 35 U.S.C. 154(b) by 95 days.

(21) Appl. No.: 17/042,608

(22) PCT Filed: Apr. 23, 2019

(86) PCT No.: PCT/CN2019/083823
§ 371 (c)(1),
(2) Date: Sep. 28, 2020

(87) PCT Pub. No.: WO2020/172980
PCT Pub. Date: Sep. 3, 2020

(65) Prior Publication Data
US 2021/0100032 A1    Apr. 1, 2021

(30) Foreign Application Priority Data
Feb. 26, 2019 (CN) .......................... 201910142205.6

(51) Int. Cl.
*H04W 4/00* (2018.01)
*H04W 74/08* (2009.01)
(Continued)

(52) U.S. Cl.
CPC ....... *H04W 74/0808* (2013.01); *H04W 48/16* (2013.01); *H04W 84/12* (2013.01)

(58) Field of Classification Search
CPC . H04W 74/0808; H04W 48/12; H04W 48/16; H04W 48/18; H04W 48/20;
(Continued)

(56) References Cited

U.S. PATENT DOCUMENTS

2013/0294354 A1    11/2013    Zhang et al.
2014/0010089 A1*    1/2014    Cai ...................... H04W 48/16
                                                              370/241
(Continued)

FOREIGN PATENT DOCUMENTS

CN    102752823 A    12/2012
CN    104285475 A    1/2015
(Continued)

OTHER PUBLICATIONS

International Search Report for International Application No. PCT/CN2019/083823; dated Nov. 26, 2019.
Park et al., "Step-wise Active Scanning in TGai", Giwon Park, LG, doc.: IEEE 802.11-12/0257r1, Mar. 3, 2012; 10 pages.

*Primary Examiner* — Temica M Beamer
(74) *Attorney, Agent, or Firm* — Cantor Colburn LLP

(57) ABSTRACT

Channel scanning method and device, storage medium and terminal are provided. The method includes: during scanning of a current channel, determining whether to prolong a minimum channel time of the current channel in a time interval before a probe request frame is sent on the current channel; if it is determined to prolong the minimum channel time of the current channel, updating the minimum channel time of the current channel, or else, maintaining the minimum channel time of the current channel, and on the current channel, contending for channel usage right based on CSMA, and when the channel usage right is acquired,
(Continued)

sending a probe request frame, and starting a minimum channel time timer, wherein a timing duration of the minimum channel time timer is set based on the minimum channel time. With embodiments of the present disclosure, channel scanning is optimized and efficiency of the channel scanning is improved.

13 Claims, 5 Drawing Sheets

(51) Int. Cl.
  *H04W 48/16* (2009.01)
  *H04W 84/12* (2009.01)
(58) Field of Classification Search
  CPC ... H04W 28/04; H04W 72/04; H04W 72/042; H04W 88/06; H04W 88/08; H04L 5/0007
  USPC .......................................... 370/329; 455/434
  See application file for complete search history.

(56) References Cited

U.S. PATENT DOCUMENTS

| | | | |
|---|---|---|---|
| 2015/0163824 A1 | 6/2015 | Kryzmien et al. | |
| 2015/0245283 A1 | 8/2015 | Park et al. | |
| 2015/0245285 A1 | 8/2015 | Kwon et al. | |
| 2016/0105888 A1* | 4/2016 | Seok | H04W 72/046 370/329 |
| 2019/0052445 A1* | 2/2019 | Rantala | H04L 5/0094 |
| 2020/0413461 A1* | 12/2020 | Abouelseoud | H04W 74/0816 |

FOREIGN PATENT DOCUMENTS

| | | |
|---|---|---|
| CN | 104412663 A | 3/2015 |
| CN | 104718780 A | 6/2015 |
| CN | 106063193 A | 10/2016 |
| CN | 108135006 A | 6/2018 |
| CN | 109219075 A | 1/2019 |
| CN | 109618395 A | 4/2019 |
| EP | 2945431 A1 | 11/2015 |

* cited by examiner

CHANNEL SCANNING METHOD AND DEVICE, STORAGE MEDIUM AND TERMINAL

CROSS-REFERENCE TO RELATED APPLICATIONS

This is the U.S. national stage of application No. PCT/CN2019/083823, filed on Apr. 23, 2019. Priority under 35 U.S.C. § 119(a) and 35 U.S.C. § 365(b) is claimed from Chinese Application No. 201910142205.6, filed Feb. 26, 2019, and entitled "CHANNEL SCANNING METHOD AND DEVICE, STORAGE MEDIUM AND TERMINAL", the entire disclosure of which is also incorporated herein by reference.

TECHNICAL FIELD

The present disclosure generally relates to communication technology field, and more particularly, to a channel scanning method and device, a storage medium and a terminal.

BACKGROUND

At present, many Wireless Fidelity (Wi-Fi) devices on the market support two frequency bands of 2.4 GHz and 5 GHz. The 2.4 GHz frequency band includes 14 channels, and the 5 GHz frequency band includes 42 channels, among which a channel bandwidth is 20 MHz or 10 MHz.

For a complete Wi-Fi channel scanning, all the above channels will be scanned. Taking a fixed scanning time of 40 milliseconds for each channel as an example, a scanning time required for the 2.4 GHz frequency band is 14×40=560 milliseconds, and a scanning time required for the 5 GHz frequency band is 42×40=1680 milliseconds. Taking a fixed scanning time of 100 milliseconds for each channel as an example, a scanning time required for the 2.4 GHz frequency band is 14×40=1400 milliseconds, and a scanning time required for the 5 GHz frequency band is 42×40=4200 milliseconds.

When the channel scanning time is relatively long, it may have many negative effects on Wi-Fi devices. For example, channel scanning before connection of a Wi-Fi device will cause the connection process to be prolonged. For another example channel scanning before roaming of a Wi-Fi device will cause the roaming process to be prolonged. For another example, channel scanning executed when the Wi-Fi device performs positioning and other functions will reduce efficiency of the positioning and other functions. Further, the longer the channel scanning lasts, the more power consumption is caused.

Therefore, efficiency of channel scanning requires to be improved.

SUMMARY

Embodiments of the present disclosure may optimize a way of channel scanning so as to improve efficiency of the channel scanning.

Embodiments of the present disclosure provide a channel scanning method, including: during scanning of a current channel, determining whether to prolong a minimum channel time of the current channel in a time interval before a probe request frame is sent on the current channel; if it is determined to prolong the minimum channel time of the current channel, updating the minimum channel time of the current channel, and if it is determined not to prolong the minimum channel time of the current channel, maintaining the minimum channel time of the current channel; and on the current channel, contending for channel usage right based on Carrier Sense Multiple Access (CSMA), and when the channel usage right is acquired, sending a probe request frame, and starting a minimum channel time timer, wherein a timing duration of the minimum channel time timer is set based on the minimum channel time.

Optionally, determining whether to prolong the minimum channel time of the current channel includes: performing channel detection on the current channel, and determining whether to prolong the minimum channel time of the current channel based on a result of the channel detection.

Optionally, performing channel detection on the current channel includes: performing channel detection on the current channel using controllable Clear Channel Assessment (CCA), wherein an energy detection threshold of the controllable CCA is lower than an energy detection threshold of CCA, and a carrier sense detection threshold of the controllable CCA is lower than a carrier sense detection threshold of the CCA.

Optionally, the time interval includes a probe delay interval, and before performing channel detection on the current channel using the controllable CCA, the method further includes: in the probe delay interval, determining the energy detection threshold and the carrier sense detection threshold of the controllable CCA based on historical channel scanning data.

Optionally, the time interval includes a probe delay interval and a channel contention access interval, and before performing channel detection on the current channel using the controllable CCA, the method further includes: in the probe delay interval and the channel contention access interval, determining the energy detection threshold and the carrier sense detection threshold of the controllable CCA based on historical channel scanning data.

Optionally, determining whether to prolong the minimum channel time of the current channel based on the result of the channel detection includes: if the result of the channel detection using the controllable CCA is higher than the energy detection threshold of the controllable CCA, and/or if the result of the channel detection using the controllable CCA is higher than the carrier sense detection threshold of the controllable CCA, prolonging the minimum channel time of the current channel.

Optionally, prolonging the minimum channel time of the current channel includes: prolonging the minimum channel time of the current channel based on a minimum channel time in historical channel scanning data.

Optionally, the channel scanning method further includes: after sending the probe request frame on the current channel, waiting to receive a probe response within the prolonged minimum channel time of the current channel.

Optionally, determining whether to prolong the minimum channel time of the current channel based on the result of the channel detection includes: if the result of the channel detection using the controllable CCA is lower than or equal to the energy detection threshold of the controllable CCA, and/or if the result of the channel detection using the controllable CCA is lower than or equal to the carrier sense detection threshold of the controllable CCA, maintaining the minimum channel time of the current channel.

Optionally, the channel scanning method further includes: when starting the minimum channel time timer, also starting a maximum channel time timer.

Embodiments of the present disclosure provide a channel scanning device, including: a determining circuitry configured to: during scanning of a current channel, determine whether to prolong a minimum channel time of the current channel in a time interval before a probe request frame is sent on the current channel; an updating or maintaining circuitry configured to: if it is determined to prolong the minimum channel time of the current channel, update the minimum channel time of the current channel, and if it is determined not to prolong the minimum channel time of the current channel, maintain the minimum channel time of the current channel; and a sending circuitry configured to: on the current channel, contend for channel usage right based on CSMA, and when the channel usage right is acquired, send a probe request frame, and start a minimum channel time timer, wherein a timing duration of the minimum channel time timer is set based on the minimum channel time.

Embodiments of the present disclosure further provide a storage medium having computer instructions stored thereon, wherein once the computer instructions are executed, the above method is performed.

Embodiments of the present disclosure further provide a terminal including a memory and a processor, wherein the memory has computer instructions stored thereon, and once the processor executes the computer instructions, the above method is performed.

Embodiments of the present disclosure may provide following advantages.

In the embodiments of the present disclosure, a channel scanning method is provided, including: during scanning of a current channel, determining whether to prolong a minimum channel time of the current channel in a time interval before a probe request frame is sent on the current channel; if it is determined to prolong the minimum channel time of the current channel, updating the minimum channel time of the current channel, and if it is determined not to prolong the minimum channel time of the current channel, maintaining the minimum channel time of the current channel; and on the current channel, contending for channel usage right based on CSMA, and when the channel usage right is acquired, sending a probe request frame, and starting a minimum channel time timer, wherein a timing duration of the minimum channel time timer is set based on the minimum channel time. Considering existence of hidden nodes, embodiments of the present disclosure adjust a channel time of the Wi-Fi device during the channel scanning by updating the minimum channel time. Compared with the existing techniques, the minimum channel time and a delay may be shortened, and scanning efficiency of the Wi-Fi device may be improved. Furthermore, by adjusting the minimum channel time, a success rate of the Wi-Fi device receiving the probe response sent from the AP with a delay caused by the busy channel where the AP is located may be effectively improved, impact brought by hidden nodes may be effectively reduced, and the number of access points scanned by the Wi-Fi device may be increased. Further, the embodiments of the present disclosure do not affect the channel scanning process of other Wi-Fi devices, and has good compatibility.

Further, performing channel detection on the current channel includes: performing channel detection on the current channel using controllable CCA, wherein an energy detection threshold of the controllable CCA is lower than an energy detection threshold of CCA, and a carrier sense detection threshold of the controllable CCA is lower than a carrier sense detection threshold of the CCA. In the embodiments, by adjusting channel detection thresholds, feasible technical solutions are provided for determining whether to prolong a minimum channel time of the current channel.

Further, the time interval includes a probe delay interval, and before performing channel detection on the current channel using the controllable CCA, the method further includes: in the probe delay interval, determining the energy detection threshold and the carrier sense detection threshold of the controllable CCA based on historical channel scanning data. In the embodiments, channel detection thresholds of the controllable CCA are adaptively adjusted based on the historical channel scanning data, which is flexible, and is conducive to adjusting the minimum channel time based on channel load information, thereby further optimizing channel scanning.

DETAILED DESCRIPTION

As described in the background, in existing techniques, a channel scanning time is relatively long, and a scanning result is not accurate enough.

At present, a main channel scanning mechanism is based on the Institute of Electrical and Electronics Engineers (IEEE) 802.11 standard protocol.

The IEEE 802.11 standard protocol defines two timers for channel scanning, where one is a Minimum Channel Time (MinCT) timer, and the other is a Maximum Channel Time (MaxCT) timer. These two timers determine length of time that a Wi-Fi device (also known as a station (STA)) can stay on a channel after sending a probe request frame.

Figure 1:
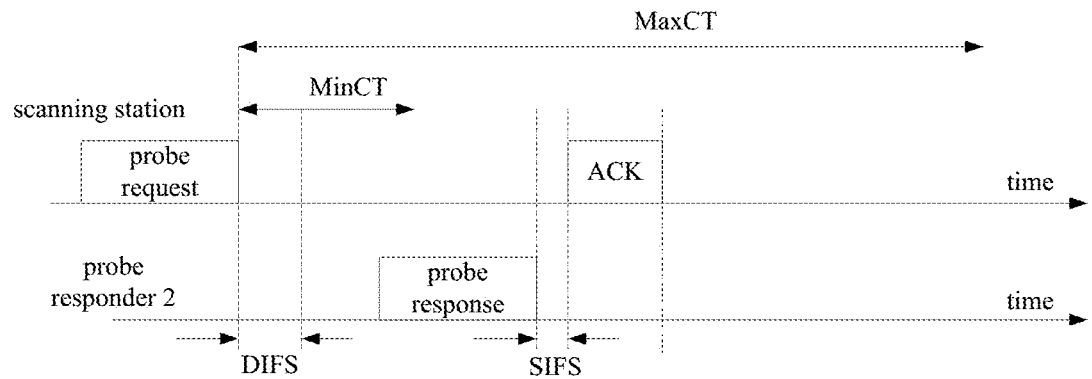
FIG. 1 is a flow chart of a channel scanning method in existing techniques.

Generally, as shown in FIG. 1, the Wi-Fi device, i.e., a scanning station in the FIG. 1, sends a probe request frame on a channel. After the sending of the probe request frame, the MinCT timer and the MaxCT timer are started. FIG. 1 illustrates a timing duration of the MinCT timer and the MaxCT timer. After sending the probe request frame, the scanning station waits for a time period to receive a probe response frame. For example, the time period may be a Distributed Interframe Space (DIFS). If receiving the probe response frame on the channel from a probe responder, the scanning station may feed back an Acknowledgement frame (ACK) after a Short Interframe Space (SIFS) to complete scanning of the channel.

Further, if the scanning station does not receive any probe response frame before the MinCT timer expires, or the scanning station detects that the channel is an idle channel, the scanning station may consider that there is no Access Point (AP) on this channel, and may jump directly to a next channel to scan.

If the scanning station receives a probe response frame before the MinCT timer expires, or the scanning station detects that the channel is not idle, the scanning station considers that there is an access point on the channel, and may stay on the channel until the MaxCT timer expires, and then jump to a next channel to scan.

In a timing process of the MinCT timer, the scanning station detects whether the channel is idle based on energy detection with a fixed detection threshold and Carrier Sense (CS) using an existing Clear Channel Assessment (CCA) mechanism.

Figure 2:
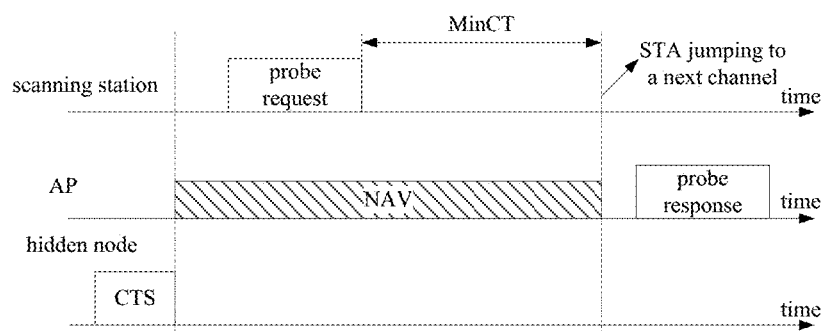
FIG. 2 is an application scenario diagram of the channel scanning method in the existing techniques.

If there is a hidden node around the scanning station, and the hidden node is non-hidden to the AP, referring to FIG. 2, the hidden node may reserve a channel usage time via protection frame exchange, such as exchange of Request To Send (RTS) frames (not shown) and Clear To Send (CTS) frames.

Under this condition, as the hidden node is non-hidden to the AP, the AP can set its Network Allocated Vector (NAV) time and not send any packets during the NAV time. However, as the hidden node is hidden to the scanning station, the scanning station does not know that the channel has been occupied by other stations. Therefore, the scanning station may send the probe request frame within the channel usage time reserved by the hidden node, and start the MinCT timer after sending the probe request frame.

If the NAV time set by the AP is too long and exceeds a timeout time of the MinCT timer, the AP may not send a probe response frame until the MinCT timer at the scanning station expires, which may cause to the scanning station misapprehension that there is no AP on the channel. Thus, the scanning station may jump to a next channel after the MinCT timer expires, and miss a subsequent probe response frame sent by the AP.

In the existing techniques, to reduce defects caused by hidden nodes, a minimum channel time is prolonged to increase probability of more APs scanned by the channel, but this may greatly reduce efficiency of scanning.

In the embodiments of the present disclosure, a channel scanning method is provided, including: during scanning of a current channel, determining whether to prolong a minimum channel time of the current channel in a time interval before a probe request frame is sent on the current channel; if it is determined to prolong the minimum channel time of the current channel, updating the minimum channel time of the current channel, and if it is determined not to prolong the minimum channel time of the current channel, maintaining the minimum channel time of the current channel; and on the current channel, contending for channel usage right based on CSMA, and when the channel usage right is acquired, sending a probe request frame, and starting a minimum channel time timer, wherein a timing duration of the minimum channel time timer is set based on the minimum channel time.

Considering existence of hidden nodes, embodiments of the present disclosure adjust a channel time of the Wi-Fi device during the channel scanning by updating the minimum channel time. Compared with the existing techniques, the minimum channel time and a delay may be shortened, and scanning efficiency of the Wi-Fi device may be improved. Furthermore, by adjusting the minimum channel time, a success rate of the Wi-Fi device receiving the probe response sent from the AP with a delay caused by the busy channel where the AP is located may be effectively improved, impact brought by hidden nodes may be effectively reduced, and the number of access points scanned by the Wi-Fi device may be increased. Further, the embodiments of the present disclosure do not affect the channel scanning process of other Wi-Fi devices, and has good compatibility.

In order to clarify the objects, characteristics and advantages of the disclosure, embodiments of present disclosure will be described in detail in conjunction with accompanying drawings.

Figure 3:
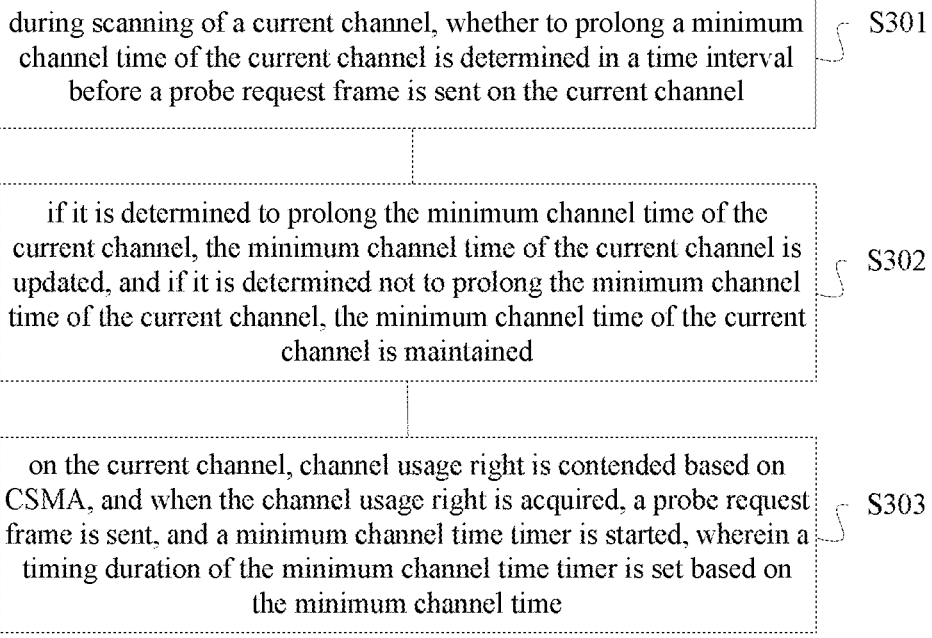
FIG. 3 is a flow chart of a channel scanning method according to an embodiment.

FIG. 3 is a flow chart of a channel scanning method according to an embodiment. The method may be performed by a Wi-Fi device. In some embodiments, the channel scanning method may include S301, S302 and S303.

In S301, during scanning of a current channel, whether to prolong a minimum channel time of the current channel is determined in a time interval before a probe request frame is sent on the current channel.

In S302, if it is determined to prolong the minimum channel time of the current channel, the minimum channel time of the current channel is updated, and if it is determined not to prolong the minimum channel time of the current channel, the minimum channel time of the current channel is maintained.

In S303, on the current channel, channel usage right is contended based on CSMA, and when the channel usage right is acquired, a probe request frame is sent, and a minimum channel time timer is started, wherein a timing duration of the minimum channel time timer is set based on the minimum channel time.

In some embodiments, in S301, when an STA jumps to an unscanned channel and scans the channel as the current channel, the STA may determine whether to adjust the minimum channel time of the current channel in the time interval before sending the probe request frame.

Specifically, when the STA starts scanning on the current channel, it needs to wait for a probe delay interval on the current channel to monitor whether the current channel is idle. Afterward, if the current channel is idle within the probe delay interval, the STA may use a controllable CCA mode to contend for a channel to send the probe request frame.

In some embodiments, the controllable CCA is different from traditional CCA in the existing techniques. A carrier sense detection threshold and an energy detection threshold of the controllable CCA are thresholds that can be adjusted adaptively, rather than fixed thresholds.

In some embodiments, before using the controllable CCA to detect the current channel, the STA may determine the energy detection threshold and carrier sense detection threshold of the controllable CCA based on historical channel scanning data within the sense delay interval. The historical channel scanning data may be determined by the STA based on the channel detection results for each channel of completed channel scanning and the number of APs scanned on the same channel.

Alternatively, if there is a probe delay interval and a channel contention access interval before the controllable CCA is used to detect the current channel, the STA may determine the energy detection threshold and the carrier sense detection threshold of the controllable CCA based on the historical channel scanning data within the sense delay interval and the channel contention access interval.

In some embodiments, the energy detection threshold of the controllable CCA may be lower than an energy detection threshold of the traditional CCA, and the carrier sense detection threshold of the controllable CCA may be lower than a carrier sense detection threshold of the traditional CCA. The two detection thresholds of the controllable CCA may be updated based on detection results of the traditional CCA.

In some embodiments, the STA may use the traditional CCA to detect the current channel during the channel contention access interval. According to a result of the channel detection, the STA may determine whether to adjust the carrier sense detection threshold and the energy detection threshold of the controllable CCA, and further determine whether to prolong the minimum channel time of the current channel based on the carrier sense detection threshold and the energy detection threshold of the controllable CCA.

In some embodiments, the energy detection threshold of the traditional CCA is significantly higher than the energy detection threshold of the controllable CCA, and the channel sense detection threshold of the traditional CCA is significantly higher than the carrier sense detection threshold of the controllable CCA. The energy detection threshold and/or the carrier sense detection threshold of the controllable CCA may be predefined before channel scanning. Under this condition, the STA may detect the channel within the channel contention access interval, and whether to increase an energy detection result and/or a carrier sensing detection result of the controllable CCA may be determined according to a result of the channel detection. The energy detection result and/or the carrier sense detection result of the controllable CCA may be equal to the energy detection result and/or the carrier sense detection result of the traditional CCA.

In S302, after the STA acquires the channel usage right through the traditional CCA, the STA may determine the energy detection result and the carrier sense detection result of the controllable CCA together. If the energy detection result of the controllable CCA is higher than the energy detection threshold of the controllable CCA, the STA may prolong the minimum channel time of the current channel, and/or if the carrier sense detection result of the controllable CCA is higher than the carrier sense detection threshold of the controllable CCA, the STA may prolong the minimum channel time of the current channel to ensure that the STA can receive a probe response frame that is delayed to be sent by the AP due to a hidden node. A prolonged time of the minimum channel time may be referred to the minimum channel time in the historical channel scanning data.

In some embodiments, if the energy detection result of the controllable CCA is lower than or equal to the energy detection threshold of the controllable CCA, and the carrier sense detection result of the controllable CCA is lower than or equal to the carrier sense detection threshold of the controllable CCA, the STA may maintain the minimum channel time of the current channel. The minimum channel time of the current channel may be a default minimum channel time specified by the IEEE 802.11 standard protocol.

In S303, after contending for the channel based on the CSMA mechanism and acquiring the channel usage right, the STA may send a probe request frame, and start a MinCT timer and a MaxCT timer. A timing duration of the MinCT timer is set based on the minimum channel time, and the MaxCT timer may be set according to the IEEE802.11 standard protocol.

In some embodiments, if the minimum channel time is prolonged, the timing duration of the MinCT timer may also be prolonged, otherwise, the timing duration of the MinCT timer may be equal to the default minimum channel time specified in the IEEE802.11 standard protocol.

Figure 4:
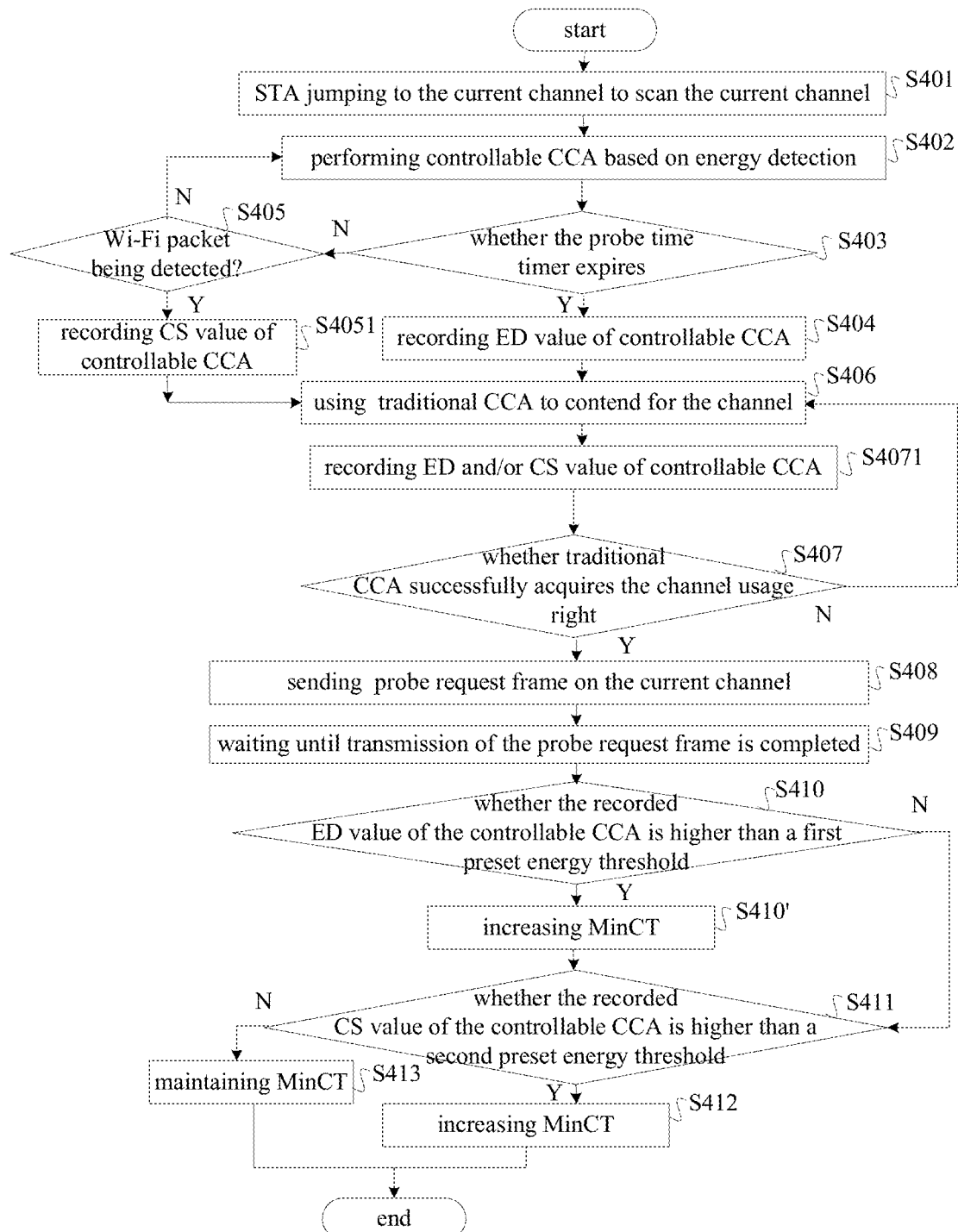
FIG. 4 is a flow chart of a channel scanning method according to an embodiment.

In a typical application scenario, as shown in FIG. 4, when the STA performs channel scanning, the STA may first perform S401, that is, the STA jumps to the current channel to scan the current channel;

Afterward, the STA may perform S402, during an operation time of a probe time timer, the STA may perform controllable CCA based on energy detection to detect an energy value (i.e., ED value) of the current channel.

Afterward, the STA may perform S403 of determining whether the probe time timer expires. If yes, the STA may perform S404 of recording the energy detection result (the ED value as shown in FIG. 4) of the controllable CCA; if not, the STA may perform S405 of determining whether a Wi-Fi packet is detected during the operation time of the probe time timer. If yes, the STA may perform S4051 of recording the carrier sense detection result (the CS value as shown in FIG. 4) of the controllable CCA, and go to S406; if not, the STA may perform S402.

Afterward, the STA may perform S406 of using the traditional CCA to contend for the channel. Those skilled in the art could understand that at this time, the STA may perform S4071 of recording the ED value and/or the CS value of the controllable CCA. The channel detection result of the controllable CCA may be determined based on the channel detection result of the traditional CCA, that is, the channel detection result of the controllable CCA may be equal to the channel detection result of the traditional CCA.

Afterward, the STA may perform S407 of determining whether the traditional CCA has successfully acquired the channel usage right. If yes, the STA may perform S408, that is, the STA may send a probe request frame on the current channel; if not, the STA may perform S406.

Afterward, the STA may perform S409 of waiting until transmission of the probe request frame is completed.

Afterward, the STA may perform S410 of determining whether the recorded ED value of the controllable CCA is higher than a first preset energy threshold. If yes, the STA may perform S410' of increasing MinCT, and continue to perform S411 of determining whether the recorded CS value of the controllable CCA is higher than a second preset energy threshold. If yes, the STA may perform S412 to increase MinCT again.

Afterward, if the recorded ED value of the controllable CCA is lower than the first preset energy threshold, and the recorded CS value of the controllable CCA is lower than the second preset energy threshold, step S413 is performed, that is, MinCT is maintained.

Figure 5:
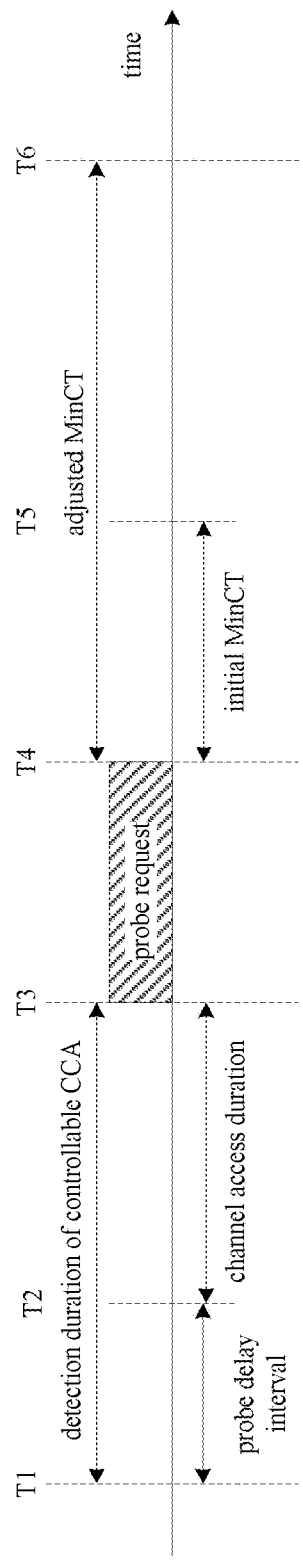
FIG. 5 is a diagram of a channel scanning process based on time according to an embodiment.

FIG. 5 is a diagram of a channel scanning process based on time according to an embodiment. Referring to FIG. 5, an STA jumps to a new channel at a time point T1 and enters a probe delay interval from the time point T1. At a time point T2, the STA tries to send a probe request frame. Before sending the probe request frame, the STA needs to contend for a channel, that is, from the time point T2, channel contention is performed. After successfully acquiring channel usage right at a time point T3, the STA sends the probe request frame. It can be known that a time period from the time point T2 to the time point T3 represents a channel access duration for the STA to contend for the channel. A time period from the time point T1 to the time point T3 is a detection duration of controllable CCA. Further, the probe request frame starts to be transmitted from the time point T3, and the transmission of the probe request frame is completed at a time point T4.

Afterward, if the STA determines to adjust the minimum channel time (i.e., MinCT as shown in FIG. 5) based on a channel detection result of the controllable CCA, MinCT is adjusted at a time point T4. In FIG. 5, a time period from the time point T4 to a time point T5 is the initiate MinCT, a time period from the time point T4 to a time point T6 is the adjusted MinCT. Further, if the channel is always in an idle state within the adjusted MinCT, the STA may jump to a next channel at the time point T6.

From above, with embodiments of the present disclosure, channel scanning may be optimized, efficiency of the channel scanning may be improved, and adverse effects caused by hidden nodes may be reduced, which is conducive to increasing the number of access points scanned by a Wi-Fi device. Further, as the solutions provided by the embodiments of the present disclosure do not affect channel scanning processes of other Wi-Fi devices, the solutions can coexist with other Wi-Fi devices in practical applications and have good compatibility.

Figure 6:
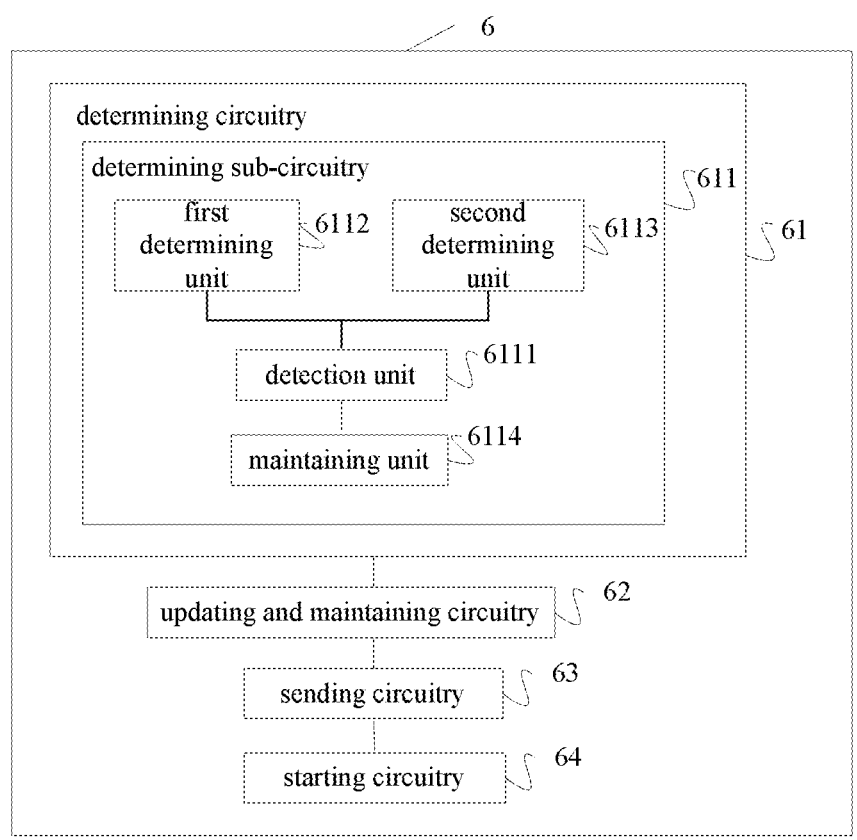
FIG. 6 is a structural diagram of a channel scanning device according to an embodiment.

FIG. 6 is a structural diagram of a channel scanning device according to an embodiment. The channel scanning device 6 may perform the method as shown in FIGS. 3 to 5, and may be mounted on a Wi-Fi device, such as a Wi-Fi station.

In some embodiments, the channel scanning device 6 may include: a determining circuitry 61 configured to: during scanning of a current channel, determine whether to prolong a minimum channel time of the current channel in a time interval before a probe request frame is sent on the current channel; an updating and maintaining circuitry 62 configured to: if it is determined to prolong the minimum channel time of the current channel, update the minimum channel time of the current channel, and if it is determined not to prolong the minimum channel time of the current channel, maintain the minimum channel time of the current channel; and a sending circuitry 63 configured to: on the current channel, contend for channel usage right based on CSMA, and when the channel usage right is acquired, send a probe request frame, and start a minimum channel time timer, wherein a timing duration of the minimum channel time timer is set based on the minimum channel time.

In some embodiments, the determining circuitry 61 includes a determining sub-circuitry 611 configured to: perform channel detection on the current channel, and determine whether to prolong the minimum channel time of the current channel based on a result of the channel detection.

In some embodiments, the determining sub-circuitry 611 includes a detection unit 6111 configured to perform channel detection on the current channel using controllable CCA, wherein an energy detection threshold of the controllable CCA is lower than an energy detection threshold of CCA, and a carrier sense detection threshold of the controllable CCA is lower than a carrier sense detection threshold of the CCA.

In some embodiments, the time interval includes a probe delay interval, and the determining sub-circuitry 611 includes a first determining unit 6112 configured to: before channel detection is performed on the current channel using the controllable CCA, in the probe delay interval, determine the energy detection threshold and the carrier sense detection threshold of the controllable CCA based on historical channel scanning data.

In some embodiments, the time interval includes a probe delay interval and a channel contention access interval, and the determining sub-circuitry 611 includes a second determining unit 6113 configured to: before channel detection is performed on the current channel using the controllable CCA, in the probe delay interval and the channel contention access interval, determine the energy detection threshold and the carrier sense detection threshold of the controllable CCA based on historical channel scanning data.

In some embodiments, the determining sub-circuitry 611 is further configured to: if the result of the channel detection using the controllable CCA is higher than the energy detection threshold of the controllable CCA, and/or if the result of the channel detection using the controllable CCA is higher than the carrier sense detection threshold of the controllable CCA, prolong the minimum channel time of the current channel.

In some embodiments, the determining sub-circuitry 611 is further configured to prolong the minimum channel time of the current channel based on a minimum channel time in historical channel scanning data.

In some embodiments, the determining sub-circuitry 611 is further configured to: after the probe request frame is sent on the current channel, wait to receive a probe response within the prolonged minimum channel time of the current channel.

In some embodiments, the determining sub-circuitry 611 includes a maintaining unit 6114 configured to: if the result of the channel detection using the controllable CCA is lower than or equal to the energy detection threshold of the controllable CCA, and/or if the result of the channel detection using the controllable CCA is lower than or equal to the carrier sense detection threshold of the controllable CCA, maintain the minimum channel time of the current channel.

In some embodiments, the channel scanning device 6 further includes a starting circuitry 64 configured to: when starting the minimum channel time timer, also start a maximum channel time timer.

More details about working principles and working modes of the channel scanning device 6 shown in FIG. 6 may be referred to the above description of FIGS. 3 to 5, and are not described here.

Embodiments of the present disclosure further provide a storage medium having computer instructions stored thereon, wherein once the computer instructions are executed, the above method as shown in FIGS. 3 to 5 is performed. In some embodiments, the storage medium may include a computer readable storage medium, such as a non-volatile memory or a non-transitory memory. The computer readable storage medium may be a Read Only Memory (ROM), a Random Access Memory (RAM), a magnetic disk or an optical disk.

Embodiments of the present disclosure further provide a terminal including a memory and a processor, wherein the memory has computer instructions stored thereon, and once executing the computer instructions, the processor performs the above method as shown in FIGS. 3 to 5. In some embodiments, the terminal may be a Wi-Fi station.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A channel scanning method, comprising:
during scanning of a current channel, determining whether to prolong a minimum channel time of the current channel in a time interval before a probe request frame is sent on the current channel;
if it is determined to prolong the minimum channel time of the current channel, updating the minimum channel time of the current channel, and if it is determined not to prolong the minimum channel time of the current channel, maintaining the minimum channel time of the current channel; and on the current channel, contending for channel usage right based on Carrier Sense Multiple Access (CSMA), and when the channel usage right is acquired, sending a probe request frame, and starting a minimum channel time timer, wherein a timing duration of the minimum channel time timer is set based on the minimum channel time.

2. The channel scanning method according to claim 1, wherein determining whether to prolong the minimum channel time of the current channel comprises:
performing channel detection on the current channel, and determining whether to prolong the minimum channel time of the current channel based on a result of the channel detection.

3. The channel scanning method according to claim 2, wherein performing channel detection on the current channel comprises:
performing channel detection on the current channel using controllable Clear Channel Assessment (CCA), wherein an energy detection threshold of the controllable CCA is lower than an energy detection threshold of CCA, and a carrier sense detection threshold of the controllable CCA is lower than a carrier sense detection threshold of the CCA.

4. The channel scanning method according to claim 3, wherein the time interval comprises a probe delay interval, and before performing channel detection on the current channel using the controllable CCA, the method further comprises:
in the probe delay interval, determining the energy detection threshold and the carrier sense detection threshold of the controllable CCA based on historical channel scanning data.

5. The channel scanning method according to claim 3, wherein the time interval comprises a probe delay interval and a channel contention access interval, and before performing channel detection on the current channel using the controllable CCA, the method further comprises:
in the probe delay interval and the channel contention access interval, determining the energy detection threshold and the carrier sense detection threshold of the controllable CCA based on historical channel scanning data.

6. The channel scanning method according to claim 3, wherein determining whether to prolong the minimum channel time of the current channel based on the result of the channel detection comprises:
if the result of the channel detection using the controllable CCA is higher than the energy detection threshold of the controllable CCA, and/or if the result of the channel detection using the controllable CCA is higher than the carrier sense detection threshold of the controllable CCA, prolonging the minimum channel time of the current channel.

7. The channel scanning method according to claim 6, wherein prolonging the minimum channel time of the current channel comprises:
prolonging the minimum channel time of the current channel based on a minimum channel time in historical channel scanning data.

8. The channel scanning method according to claim 7, further comprising:
after sending the probe request frame on the current channel, waiting to receive a probe response within the prolonged minimum channel time of the current channel.

9. The channel scanning method according to claim 3, wherein determining whether to prolong the minimum channel time of the current channel based on the result of the channel detection comprises:
if the result of the channel detection using the controllable CCA is lower than or equal to the energy detection threshold of the controllable CCA, and/or if the result of the channel detection using the controllable CCA is lower than or equal to the carrier sense detection threshold of the controllable CCA, maintaining the minimum channel time of the current channel.

10. The channel scanning method according to claim 1, further comprising:
when starting the minimum channel time timer, also starting a maximum channel time timer.

11. A channel scanning device, comprising:
a determining circuitry configured to: during scanning of a current channel, determine whether to prolong a minimum channel time of the current channel in a time interval before a probe request frame is sent on the current channel;
an updating or maintaining circuitry configured to: if it is determined to prolong the minimum channel time of the current channel, update the minimum channel time of the current channel, and if it is determined not to prolong the minimum channel time of the current channel, maintain the minimum channel time of the current channel; and
a sending circuitry configured to: on the current channel, contend for channel usage right based on Carrier Sense Multiple Access (CSMA), and when the channel usage right is acquired, send a probe request frame, and start a minimum channel time timer, wherein a timing duration of the minimum channel time timer is set based on the minimum channel time.

12. A non-transitory storage medium having computer instructions stored thereon, wherein once the computer instructions are executed, the method according to claim 1 is performed.

13. A terminal comprising a memory and a processor, wherein the memory has computer instructions stored thereon, and once the processor executes the computer instructions, the method according to claim 1 is performed.

* * * * *